United States Patent
Bireaud et al.

(10) Patent No.: US 12,553,676 B2
(45) Date of Patent: Feb. 17, 2026

(54) HEAT EXCHANGE MODULE COMPRISING AT LEAST TWO HEAT EXCHANGERS

(71) Applicant: Valeo Systemes Thermiques, Le Mesnil-Saint-Denis (FR)

(72) Inventors: Fabien Bireaud, Le Mesnil-Saint-Denis (FR); José Trindade, Le Mesnil-Saint-Denis (FR); Rémi Tournois, Le Mesnil-Saint-Denis (FR); Mathieu Caparros, Le Mesnil-Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 324 days.

(21) Appl. No.: 18/010,672

(22) PCT Filed: Jun. 16, 2021

(86) PCT No.: PCT/EP2021/066263
§ 371 (c)(1),
(2) Date: Dec. 15, 2022

(87) PCT Pub. No.: WO2021/255104
PCT Pub. Date: Dec. 23, 2021

(65) Prior Publication Data
US 2023/0235979 A1    Jul. 27, 2023

(30) Foreign Application Priority Data

Jun. 16, 2020 (FR) .................................. 2006283

(51) Int. Cl.
*F28F 27/02* (2006.01)
*B60L 50/60* (2019.01)
(Continued)

(52) U.S. Cl.
CPC .............. *F28F 27/02* (2013.01); *B60L 50/60* (2019.02); *B60L 58/26* (2019.02); *F28D 1/024* (2013.01);
(Continued)

(58) Field of Classification Search
CPC ........ F28F 27/02; F28D 1/024; F28D 1/0435; F28D 2021/0091; F28D 2021/0096;
(Continued)

(56) References Cited

U.S. PATENT DOCUMENTS 4,383,642 A * 5/1983 Sumikawa ......... B60H 1/00678
  237/12.3 A
4,546,617 A * 10/1985 Suzuki ............... B60H 1/00028
  165/43
(Continued)

FOREIGN PATENT DOCUMENTS

DE  102004034313 A1  2/2006
DE  102009056616 A1  6/2011
(Continued)

OTHER PUBLICATIONS

International Search Report and Written Opinion issued in corresponding International Application No. PCT/EP2021/066263, mailed on Aug. 27, 2021 (14 pages).
(Continued)

*Primary Examiner* — Claire E Rojohn, III
(74) *Attorney, Agent, or Firm* — Osha Bergman Watanabe & Burton LLP

(57) ABSTRACT

A heat exchange module having a first heat exchanger, configured to enable heat exchange between a first fluid and a flow of air and extending inside a first plane of overall extension, and a second heat exchanger, configured to enable heat exchange between a second fluid and the flow of air and extending inside a second plane of overall extension, is
(Continued)

disclosed. A housing delimiting, with the first heat exchanger, a circulation channel for the flow of air is included. The module has at least one air distribution member, movable between a position in which the air distribution member allows the flow of air to pass through the first heat exchanger and the second heat exchanger, and a position in which the air distribution member prevents the flow of air from passing through the first heat exchanger while allowing the flow of air to pass through the second heat exchanger.

7 Claims, 7 Drawing Sheets

(51) Int. Cl.
*B60L 58/26* (2019.01)
*F28D 1/02* (2006.01)
*F28D 1/04* (2006.01)
*F28D 21/00* (2006.01)

(52) U.S. Cl.
CPC ........ *F28D 1/0435* (2013.01); *B60L 2240/34* (2013.01); *B60L 2240/36* (2013.01); *B60L 2240/545* (2013.01); *F28D 2021/0091* (2013.01); *F28D 2021/0096* (2013.01)

(58) Field of Classification Search
CPC ...... B60L 50/60; B60L 58/26; B60L 2240/34; B60L 2240/36; B60L 2240/545
USPC ....................................................... 165/103
See application file for complete search history.

(56) References Cited

U.S. PATENT DOCUMENTS

| | | | | |
|---|---|---|---|---|
| 5,853,323 A * | 12/1998 | Beck | ................. | B60H 1/00521 137/454.2 |
| 6,189,801 B1 * | 2/2001 | Klingler | ............. | B60H 1/00521 237/12.3 B |
| 6,311,763 B1 * | 11/2001 | Uemura | ................. | B60H 1/247 62/244 |
| 6,607,029 B2 * | 8/2003 | Danieau | ............. | B60H 1/00671 454/126 |
| 7,823,631 B2 * | 11/2010 | Tonnelier | ........... | B60H 1/00057 165/203 |
| 7,967,063 B2 * | 6/2011 | Sato | ................. | B60H 1/00842 454/156 |
| 8,091,623 B2 * | 1/2012 | Hackl | ................. | B60H 1/00685 237/12.3 A |
| 8,113,268 B2 * | 2/2012 | Stevenson | ......... | B60H 1/00835 137/865 |
| 8,261,814 B2 * | 9/2012 | Lempa | ................... | F28F 27/02 165/158 |
| 8,297,049 B2 * | 10/2012 | Ohtani | ................. | F28D 7/1676 165/157 |
| 8,424,296 B2 * | 4/2013 | Burgers | ................ | F28F 13/06 60/299 |
| 8,474,513 B2 * | 7/2013 | Koukouravas | ..... | B60H 1/00542 165/203 |
| 8,746,327 B2 * | 6/2014 | Mooij | ................... | F28D 9/0093 165/122 |
| 8,793,986 B2 * | 8/2014 | Caine | ................... | F28D 9/0093 60/299 |
| 8,944,144 B2 * | 2/2015 | Elliot | ................. | B60H 1/00028 454/126 |
| 8,950,384 B2 * | 2/2015 | Vigild | ................ | F02B 29/0418 60/599 |
| 9,744,829 B2 * | 8/2017 | Wang | ................... | B60H 1/248 |
| 11,446,976 B2 * | 9/2022 | Lee | ................... | B60H 1/00057 |
| 2003/0217833 A1 * | 11/2003 | Alber | ................... | B60H 3/024 62/275 |
| 2010/0263637 A1 * | 10/2010 | Muller | ............... | F02B 29/0418 123/556 |
| 2012/0168125 A1 | 7/2012 | Johnston et al. | | |
| 2013/0014913 A1 * | 1/2013 | Hara | ................... | B60H 1/0005 165/103 |
| 2013/0239571 A1 * | 9/2013 | Hartmann | ............. | F01K 23/10 165/103 |
| 2014/0246173 A1 * | 9/2014 | Cheadle | ................ | F28F 27/02 165/103 |
| 2015/0218997 A1 * | 8/2015 | Kato | ...................... | F01N 13/08 165/103 |
| 2015/0285142 A1 * | 10/2015 | Wickham | ............... | F28D 7/106 165/103 |
| 2016/0146555 A1 * | 5/2016 | Champneys | ........... | F28F 13/06 165/103 |
| 2017/0174040 A1 * | 6/2017 | Feltham | ............. | B60H 1/00021 |
| 2022/0018615 A1 * | 1/2022 | Bireaud | ................ | F28F 9/002 |
| 2022/0169108 A1 * | 6/2022 | Jouanny | .................... | F01P 5/06 |
| 2023/0008669 A1 * | 1/2023 | Bireaud | ................... | F01P 11/10 |
| 2023/0235979 A1 * | 7/2023 | Bireaud | ........... | H01M 10/6567 165/103 |

FOREIGN PATENT DOCUMENTS

| | | | | |
|---|---|---|---|---|
| EP | 0838356 A2 | 4/1998 | | |
| FR | 2929884 A3 | 10/2009 | | |
| FR | 3076605 A1 | 7/2019 | | |
| WO | WO-2015129348 A1 * | 9/2015 | ............ | B60K 11/04 |

OTHER PUBLICATIONS

Preliminary Search Report issued in corresponding French Application No. 2006283, dated Jan. 15, 2021 (12 pages).

* cited by examiner

HEAT EXCHANGE MODULE COMPRISING AT LEAST TWO HEAT EXCHANGERS

The present invention relates to a heat exchange module comprising at least two heat exchangers. Another subject of the present invention is a heat exchange system having engine fans able to circulate a flow of air through such a heat exchange module. Another subject of the present invention is an installation for the heat treatment of a motor vehicle interior and an electrical energy storage device of the motor vehicle and/or means for controlling an electric motor propelling the motor vehicle, comprising such a heat exchange system. Another subject of the present invention is a motor vehicle provided with at least one electric motor and equipped with such a heat treatment installation. Another subject of the present invention is a method for implementing such a heat treatment installation.

A motor vehicle equipped with an electric motor forming a propulsion means of the motor vehicle is provided with an electrical energy storage device for supplying electrical energy to the electric motor when the motor vehicle is moving, that is to say is in running mode. When the motor vehicle is stopped, it is necessary to recharge the electrical energy storage device with electrical energy.

It is known practice to charge the electrical storage device of the motor vehicle by connecting it to the domestic grid for several hours. This charging technique makes it possible to keep the temperature of the electrical storage device below a certain threshold, thereby avoiding the need to use any system for cooling the electrical storage device.

A new, rapid-charging, technique has recently been developed. This involves charging the electrical storage device at a high voltage and current, so as to charge the electrical storage device over a time of at most twenty minutes. This rapid charging causes the electrical storage device to heat up, this needing to be effectively cooled down. To that end, a refrigerant fluid circuit comprising a heat exchanger is configured to collect heat energy at the electrical storage device and discharge this heat energy to a flow of air which passes through the heat exchanger.

The electric motor is equipped with control means to control its implementation. Such control means also tend to heat up when they are operating and it is also necessary to cool them down effectively. To that end, a circuit for cooling the control means comprising another heat exchanger is configured to collect heat energy at the control means and discharge this heat energy to a flow of air which passes through this heat exchanger.

Lastly, the motor vehicle has a vehicle interior within which a user sits and the temperature of which it is desirable to be able to modify via an intake of air blown into the vehicle interior.

A general problem in the field is that of finding a better compromise between effective cooling of the control means of the electric motor which heat up, notably when the motor vehicle is moving, and therefore when the motor vehicle is in running mode, modification of a temperature of the air present inside the motor vehicle interior, which is essentially necessary when the vehicle is in rolling mode, and effective cooling of the electrical storage device, which is imperative when the motor vehicle is stopped and when the electrical storage device is in rapid charging mode.

Furthermore, it is desirable to optimize the cooling of the electrical storage device and notably to optimize heat exchange between the flow of air and the heat exchanger constituting the refrigerant fluid circuit.

Lastly, it is desirable to minimize the bulk created by the heat exchangers.

The aim of the present invention is to propose a heat exchange module having at least two heat exchangers, which is arranged notably to enable an adapted exchange of heat depending on whether the motor vehicle is in running mode or in rapid charging mode, with the heat exchange module still being as compact as possible, as lightweight as possible and as easy and quick to assemble as possible.

A module of the present invention is a heat exchange module comprising at least two heat exchangers, namely a first heat exchanger, which is configured to enable heat exchange between a first fluid and a flow of air and which extends inside a first plane of overall extension, and a second heat exchanger, which is configured to enable heat exchange between a second fluid and the flow of air and which extends inside a second plane of overall extension. The first plane of overall extension is separate from the second plane of overall extension. The heat exchange module comprises at least one housing delimiting, with the first heat exchanger, a circulation channel for the flow of air.

According to the present invention, the heat exchange module comprises at least one air distribution member, which is movable between a first position, in which the air distribution member allows the flow of air to pass through the first heat exchanger and the second heat exchanger, and a second position, in which the air distribution member prevents the flow of air from passing through the first heat exchanger while still allowing the flow of air to pass through the second heat exchanger.

It will be noted that the second heat exchanger may be configured to be traversed by a second fluid, which is distinct from or identical to the first fluid.

The heat exchange module comprises at least any one of the following technical features, considered on their own or in combination:

- the air distribution member comprises at least one flap which can rotate about an axis of rotation belonging to the flap, the heat exchange module comprising an operating member which is intended for operating the flap and is configured to actuate the flap via an axis of operation of the flap, the flap extending between a first longitudinal end and a second longitudinal end of the flap, which ends are comprised inside a plane of overall elongation of the flap, the axis of rotation and/or the axis of operation being able to be inscribed in the plane of overall elongation of the flap,
- the axis of rotation and the axis of operation are separate from one another,
- the axis of rotation and the axis of operation coincide,
- the first longitudinal end of the flap has a tapered profile and the second longitudinal end of the flap has a curved profile,
- the first longitudinal end of the flap has a curved profile and the second longitudinal end of the flap has a tapered profile,
- the first longitudinal end of the flap comprises the axis of rotation, whereas the second longitudinal end of the flap comprises the axis of operation,
- the second longitudinal end of the flap comprises the axis of rotation and the axis of operation of said flap,
- the heat exchange module comprises a single flap, the first longitudinal end of which is contiguous with the first heat exchanger at least in the second position of the flap,
- the heat exchange module comprises at least two flaps, namely at least one first flap, the first longitudinal end of which is contiguous with the first heat exchanger, and at least one second flap, the first longitudinal end of which is contiguous with the second end of the first flap, at least in the second position of the first flap and of the second flap, the first end of the second flap is contiguous with the second end of the first flap in the first position, in which the flaps allow the flow of air to pass through the first heat exchanger and the second heat exchanger, and in the second position of the first flap and the second flap, in which the flaps prevent the flow of air from passing through the first heat exchanger while still allowing the flow of air to pass through the second heat exchanger, the first longitudinal end of at least one from among the first and/or the second flap has a tapered profile and the second longitudinal end of said flap has a curved profile, the first longitudinal end of at least one from among the first and/or the second flap has a curved profile and the second longitudinal end of said flap has a tapered profile, the first plane of overall extension of the first heat exchanger and the second plane of overall extension of the second heat exchanger are concurrent and between them form a first angle of less than 45°, the first angle is less than 15°, the first heat exchanger and the second heat exchanger each comprise a heat exchange core interposed between two end plates, a dimension of the first heat exchanger measured between the two end plates being smaller than a dimension of the second heat exchanger measured between its two end plates, a first end plate of the first heat exchanger is vertically above a line of the second heat exchanger, the line extending at a first distance corresponding to one third, to within +/−10%, of a total transverse dimension of the second heat exchanger, a second end plate of the first heat exchanger is at a second, non-zero distance from the second heat exchanger so as to form an intake opening for the flow of air toward the second heat exchanger, the housing comprising an air inlet, the distribution member extending from the intake opening to the air inlet, the second heat exchanger comprises at least two parallel circulation passes of the second fluid, the line of the second heat exchanger corresponding to a separation between two passes of the second heat exchanger, the first heat exchanger is vertically above at least two passes of the second heat exchanger.

Another subject of the present invention is a heat exchange system having engine fans that are able to circulate the flow of air through such a heat exchange module, the housing comprising at least one air inlet which extends into an inlet plane forming, with the first plane of overall extension of the first heat exchanger, a second angle which is between 45° and 135°, the housing comprises at least one first wall arranged as a guide ramp for the flow of air that is vertically above the first heat exchanger and that extends between the air inlet and a first end plate of the second heat exchanger, the housing comprises a second wall which extends between the air inlet and a second end plate of the second heat exchanger, an air outlet of the housing, which can be inscribed inside an outlet plane that is parallel, or substantially parallel, to the second plane of overall extension of the second heat exchanger, the housing comprises at least one oblong aperture forming a passage for an operating member of the flap, the oblong aperture is formed in a sidewall of the housing which adjoins the guide ramp.

Another subject of the present invention is a heat treatment installation for the heat treatment of at least a motor vehicle interior and an electrical energy storage device of the motor vehicle and/or control means for an electric motor propelling the motor vehicle, comprising at least one such heat exchange system, wherein the first heat exchanger constitutes a cooling circuit for cooling the control means for the electric motor, and wherein the second heat exchanger constitutes a refrigerant fluid circuit configured to modify a temperature of the electrical energy storage device and/or of blown air intended to be admitted into the motor vehicle interior.

Another subject of the present invention is a motor vehicle equipped with such a heat treatment installation, the motor vehicle being provided with at least one electric motor forming a propulsion means of the motor vehicle.

Another subject of the present invention is a method for implementing such a heat treatment installation, in which:

in the running mode of the motor vehicle, the air distribution member is placed in a first position to enable the flow of air entering the housing via an air inlet to pass through the first heat exchanger, configured as a radiator, to cool the control means and to pass through the second heat exchanger, configured as a condenser, to cool the second fluid circulating inside the refrigerant fluid circuit, in the rapid charging mode of the electrical storage device, the air distribution member is placed in a second position to prevent circulation of the flow of air through the first heat exchanger and to prioritize circulation of the flow of air through the second heat exchanger, configured as a condenser, to cool the second fluid circulating inside the refrigerant fluid circuit and cool the electrical energy storage device and/or the blown air intended to be admitted into the motor vehicle interior.

The invention will be better understood on reading the following nonlimiting description, which is given with reference to the appended drawings, in which.

Figure 1:
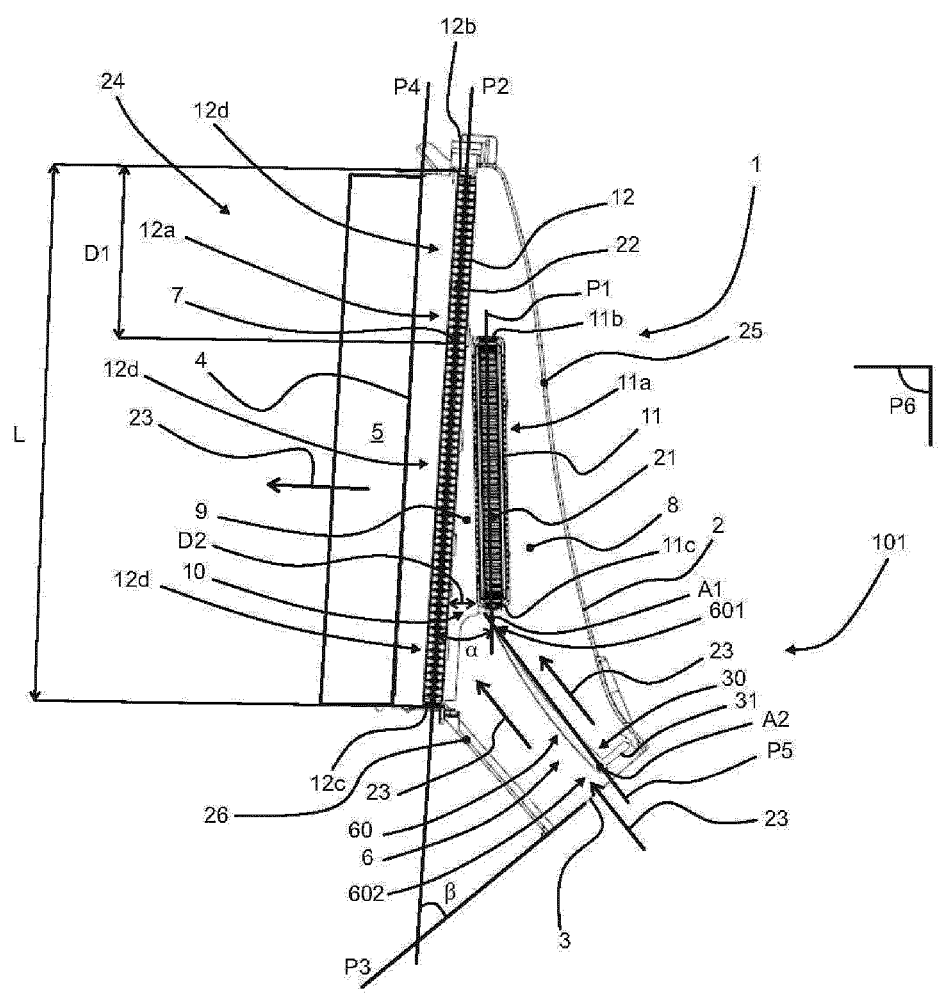
FIG. 1 shows a heat exchange module of the present invention comprising a flap arranged in accordance with a first variant embodiment and shown in a first position.

In FIGS. 1 to 6, a motor vehicle is equipped with a heat exchange module 1 comprising at least two heat exchangers 11, 12, namely a first heat exchanger 11 and a second heat exchanger 12. The first heat exchanger 11 is configured to enable an exchange of heat between a first fluid 21, which circulates inside the first heat exchanger 11, and a flow of air 23. The second heat exchanger 12 is configured to enable an exchange of heat between a second fluid 22, which is preferably distinct from the first fluid 21, and the flow of air 23.

The heat exchange module 1 comprises a housing 2 which accommodates the first heat exchanger 11 and the second heat exchanger 12. The housing 2 has an air inlet 3 via which the flow of air 23 is admitted into the housing 2. The housing 2 has an air outlet 4 via which the flow of air 23 is discharged from the housing 2.

According to the variant illustrated, the air outlet 4 is equipped with engine fans 5 which are able to circulate the flow of air 23 from the air inlet 3 to the air outlet 4. It will be understood that the engine fans 5 are configured to aspirate the flow of air 23 from the air inlet 3 to the air outlet 4. According to another variant embodiment, the engine fans are part of the air inlet and are configured to propel the flow of air from the air inlet to the air outlet. The engine fans 5 and the heat exchange module 1 together form a heat exchange system 24 which is able to modify a temperature of the first fluid 21 and/or of the second fluid 22.

In certain use configurations of the heat exchange module 1, it is desirable for the flow of air 23 to undergo an exchange of heat with the first fluid 21, circulating inside the first heat exchanger 11, and with the second fluid 22, circulating inside the second heat exchanger 12. In other use configurations of the heat exchange module 1, it is desirable for the flow of air 23 not to undergo an exchange of heat with the first fluid 21, circulating inside the first heat exchanger 11, in order to prioritize circulation of the flow of air 23 through the second heat exchanger 12. These dispositions aim notably to optimize an exchange of heat between the flow of air 23 and the second fluid 22 circulating inside the second heat exchanger 12, and more particularly to cool the second fluid 22 as much as possible.

Figure 2:
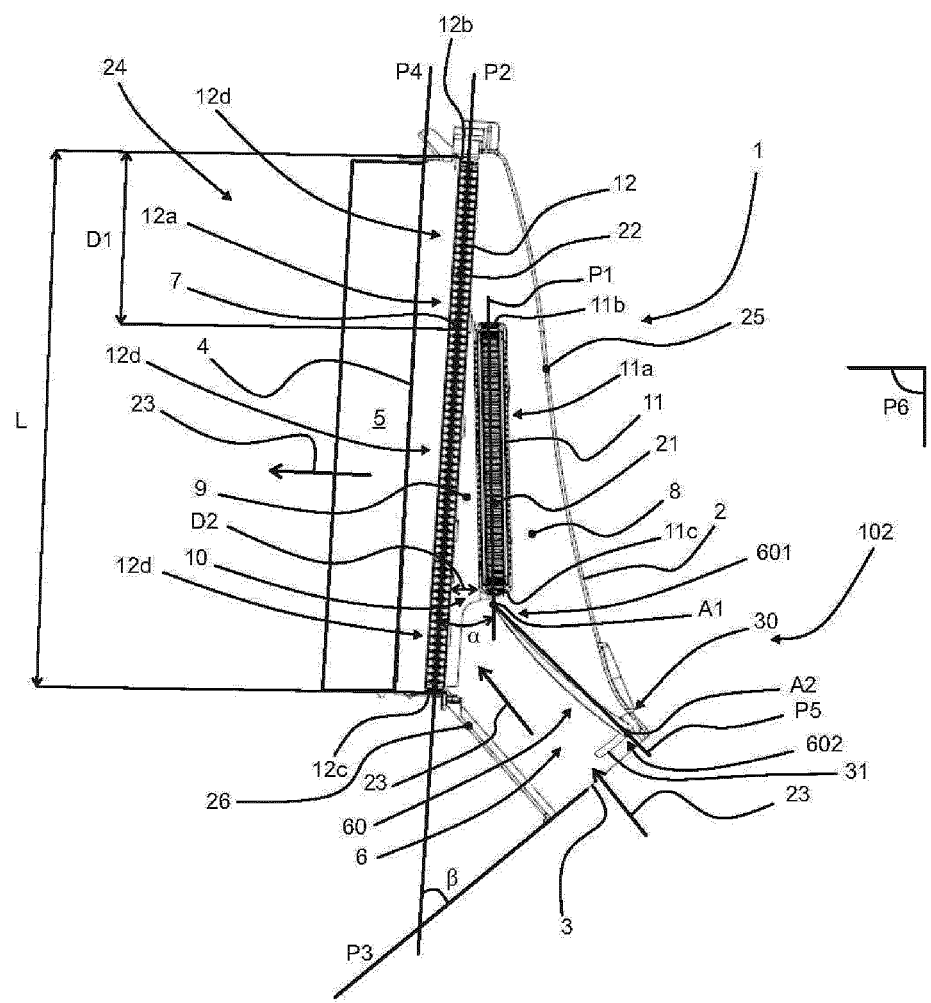
FIG. 2 shows the heat exchange module illustrated in FIG. 1, the flap of which is shown in a second position.
Figure 3:
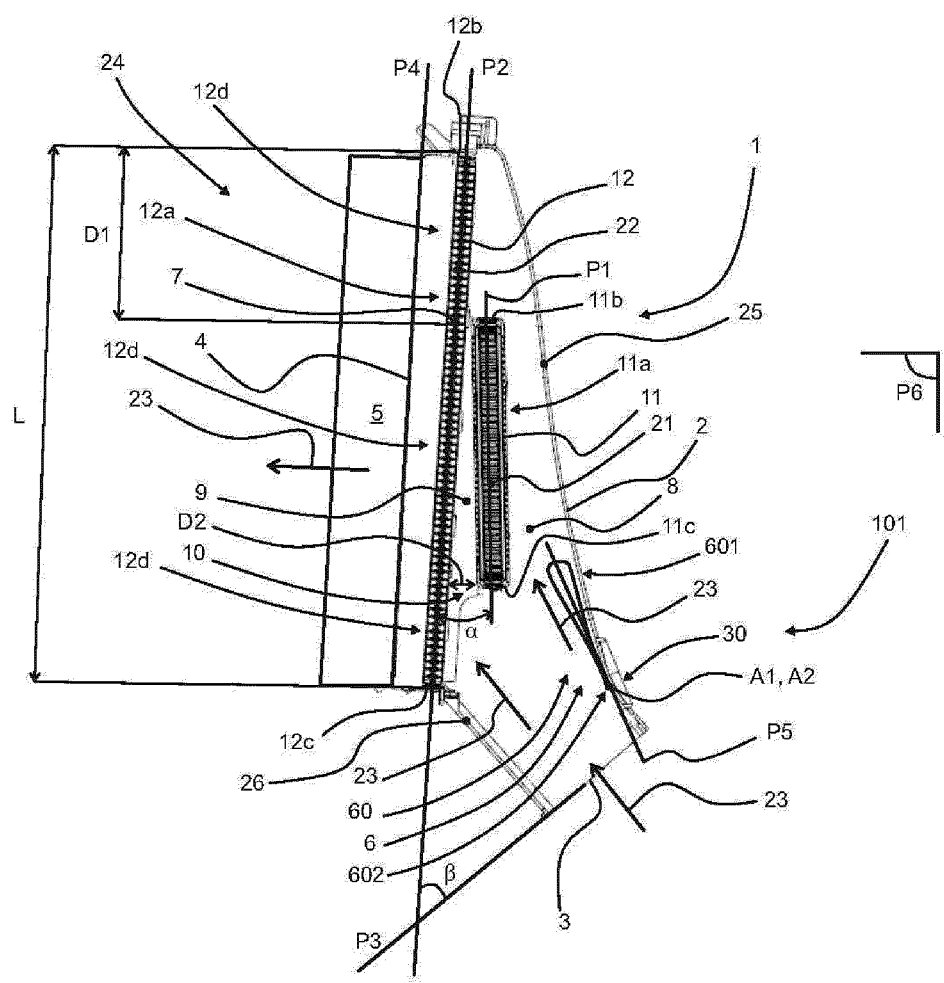
FIG. 3 shows a heat exchange module of the present invention comprising a flap arranged in accordance with a second variant embodiment and shown in a first position.
Figure 4:
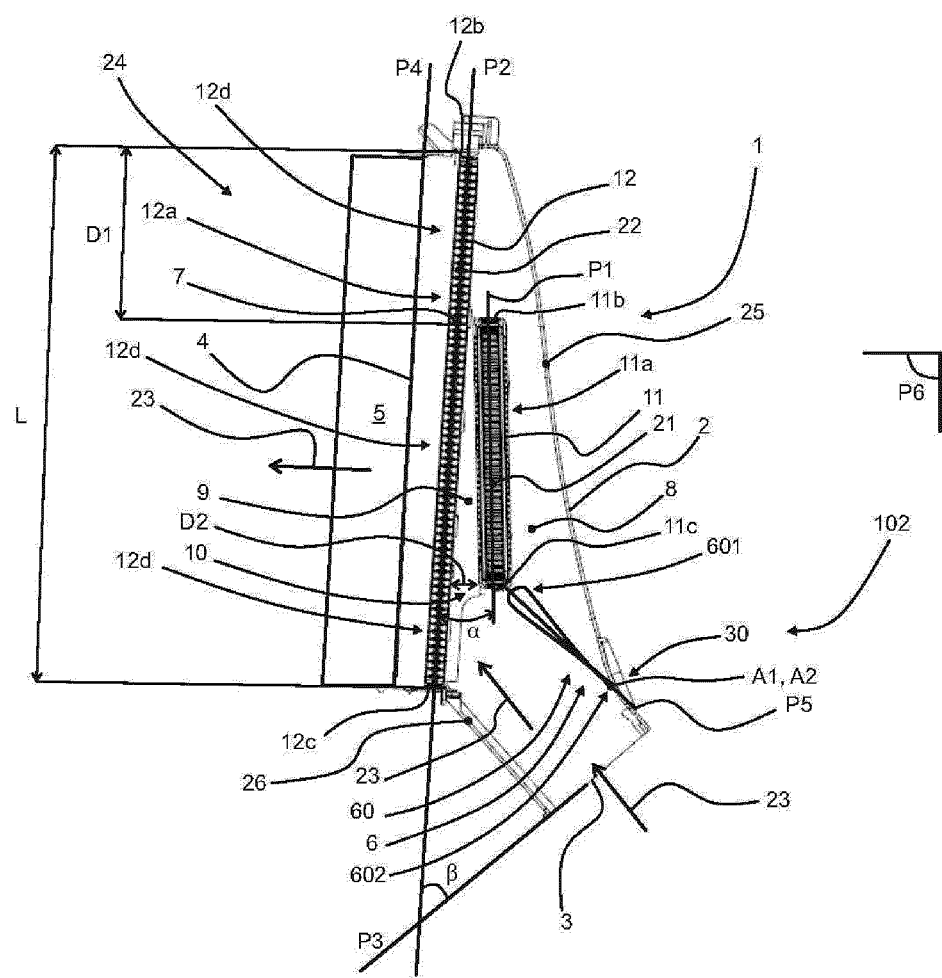
FIG. 4 shows the heat exchange module illustrated in FIG. 3, the flap of which is shown in a second position.
Figure 5:
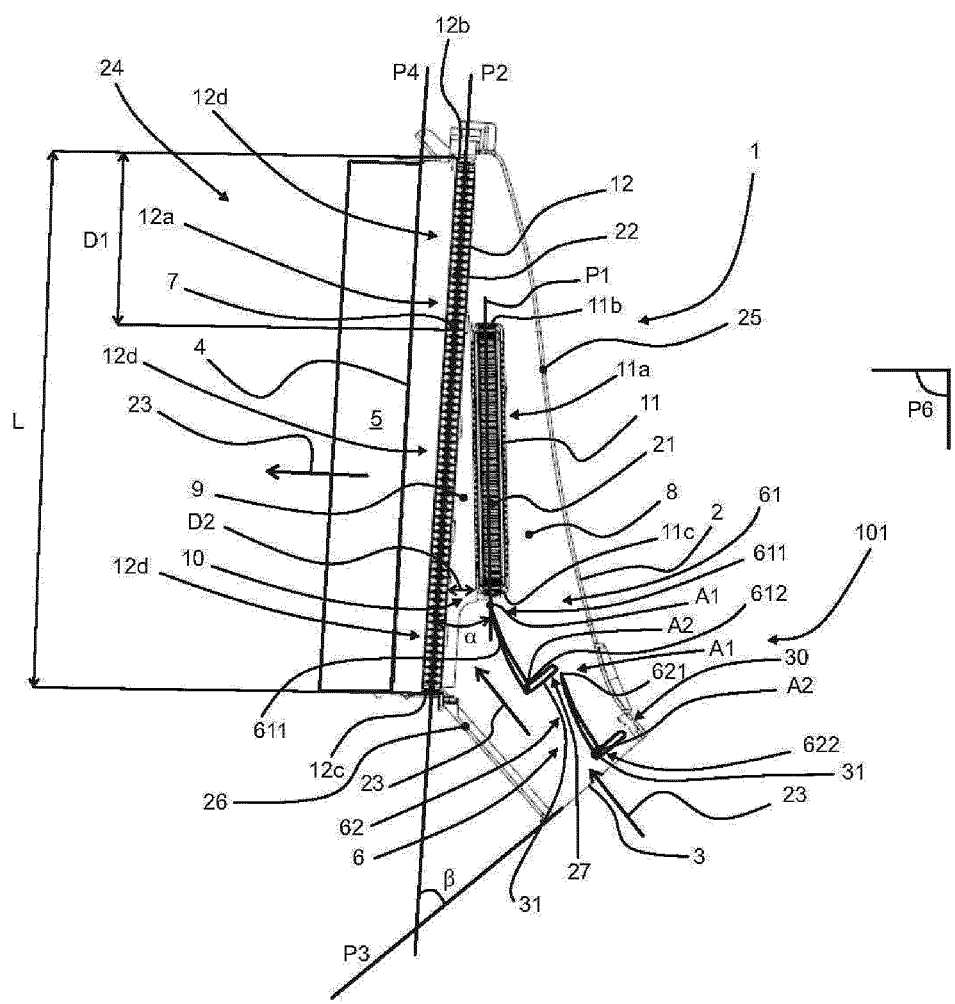
FIG. 5 shows a heat exchange module of the present invention comprising two flaps arranged in accordance with a third variant embodiment and shown in a first position.
Figure 6:
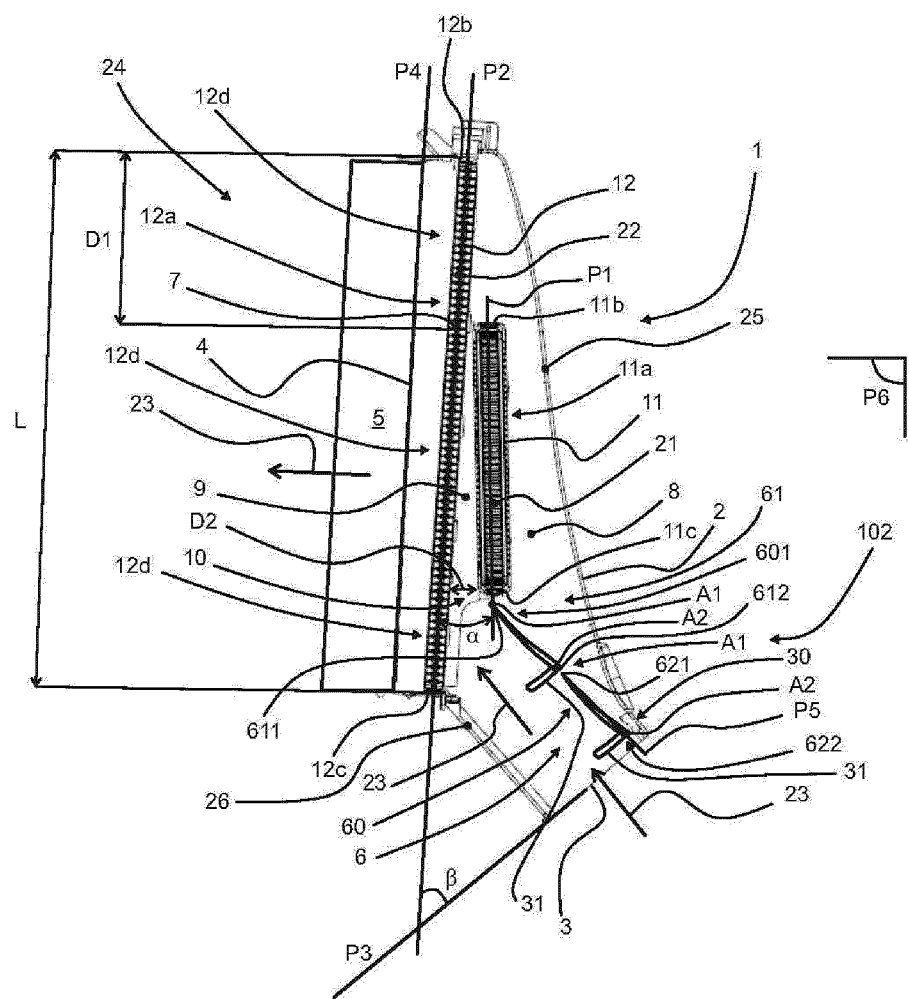
FIG. 6 shows the heat exchange module illustrated in FIG. 5, the flaps of which are shown in a second position.

To that end, the heat exchange module 1 of the present invention comprises an air distribution member 6, which is movable between a first position 101, in which the air distribution member 6 allows the flow of air 23 to pass through the first heat exchanger 11 and the second heat exchanger 12, as illustrated in FIGS. 1, 3 and 5, and a second position 102, in which the air distribution member 6 prevents the flow of air 23 from passing through the first heat exchanger 11 while still allowing the flow of air 23 to pass through the second heat exchanger 12, as illustrated in FIGS. 2, 4 and 6.

It will be noted at this stage of the description that the circulation of the flow of air 23 inside the housing 2 is guided by the housing 2 which surrounds the two heat exchangers 11, 12 and by the air distribution member 6 without needing to use any other wall delimiting circulation channels for the flow of air, and notably walls made in one piece with the housing, or made from a material similar to the constituent material of the housing. In other words, the circulation of the flow of air 23 inside the housing 2 is guided by the housing 2, the heat exchangers 11, 12 and the air distribution member 6, excluding any other element, wall or channel which could create pressure drops, which adversely affect the optimized efficiency of the heat exchange module 1. It will be understood that the heat exchange module 1 of the present invention comprises a minimum number of elements that are advantageously disposed with respect to one another so as to minimize their number and mass. It will be noted, notably, that the housing 2 is arranged in an envelope accommodating the heat exchangers 11, 12 and the air distribution member 6 without accommodating any other wall necessary for guiding the flow of air 23. This results in the heat exchange module 1 being easy to produce and the constituent elements of the heat exchange module 1 being easy to assemble together. This also results in the heat exchange module 1 being as compact and lightweight as possible.

To optimize the heat exchanges that take place inside the heat exchange module 1 in any use configuration of the heat exchange module 1 mentioned above, the first heat exchanger 11, which extends inside a first plane of overall extension P1, and the second heat exchanger 12, which extends inside a second plane of overall extension P2, are disposed such that the first plane of overall extension P1 is separate from the second plane of overall extension P2. In other words, the heat exchangers 11, 12 are not able to be inscribed in one and the same plane. It will be understood that the plane of overall extension P1, P2 of each of the heat exchangers 11, 12 is the plane in which it is possible to measure the two largest dimensions of the heat exchanger 11, 12. Thus, in the plane of overall extension P1, P2 of a heat exchanger 11, 12, which is frequently parallelepipedal, it is possible to measure a length and a width of the heat exchanger 11, 12 but not a thickness of the heat exchanger 11, 12, which is a dimension smaller than the length and the width of the heat exchanger 11, 12.

More particularly, the first heat exchanger 11 comprises a first heat exchange core 11a interposed between two end plates 11b, 11c and the second heat exchanger 12 comprises a second heat exchange core 12a interposed between two end plates 12b, 12c, a dimension of the first heat exchanger 11 measured between the two first end plates 11b, 11c being smaller than a dimension of the second heat exchanger 12 measured between its two end plates 12b, 12c. It will be understood that such a dimension of the first heat exchanger 11 and of the second heat exchanger 12 is formed either by its length or its width, its length being defined as a dimension larger than its width. It will be understood that, in terms of this dimension, the first heat exchanger 11 is smaller than the second heat exchanger 12.

A first end plate 11b of the first heat exchanger 11 is vertically above a line 7 of the second heat exchanger 12. The line 7 extends parallel to the second end plates 12b, 12c of the second heat exchanger 12. The line 7 is placed at a first distance D1 corresponding to one third, to within +/−10%, of a total transverse dimension L of the second heat exchanger 12 from one of the two end plates 12b, 12c of the second heat exchanger 12. It will be understood that the total transverse dimension L of the second heat exchanger 12 is the dimension which extends between the two second end plates 12b, 12c of the second heat exchanger 12.

The second heat exchanger 12 comprises for example three circulation passes 12d of the second fluid 22 which are parallel to one another and which together form the heat exchange core 12a. In this case, the line 7 of the second heat exchanger 12 preferably corresponds to a separation between two passes 12d of the second heat exchanger 12. The first heat exchanger 11 is then vertically above two passes 12d of the second heat exchanger 12.

The housing 2 delimits, with the first heat exchanger 11, a circulation channel 8 which is traversed by the flow of air 23 when the air distribution member 6 is placed in a first position 101, as illustrated in FIGS. 1, 3 and 5. When the air distribution member 6 is placed in a second position 102, as illustrated in FIGS. 2, 4 and 6, the air distribution member 6 isolates the circulation channel 8, which does not receive the flow of air 23.

According to the embodiment illustrated in FIGS. 1 to 6, the first plane of overall extension P1 of the first heat exchanger 11 and the second plane of overall extension P2 of the second heat exchanger 12 are concurrent and between them form a first angle α which is less than 45°, and which is preferably less than 15°. According to another embodiment, the first plane of overall extension of the first heat exchanger and the second plane of overall extension of the second heat exchanger are parallel.

Furthermore, the air inlet 3 extends inside an inlet plane P3 which forms, with the first plane of overall extension P1 of the first heat exchanger 11, a second angle β which is between 45° and 135°. The air outlet 4 of the housing 2, which for its part can be inscribed inside an outlet plane P4 that is parallel to the second plane of overall extension P2 of the second heat exchanger 12.

The first heat exchanger 11 and the second heat exchanger 12 together delimit a circulation chamber 9 which is traversed by the flow of air 23 when the air distribution member 6 is placed in the first position 101, as illustrated in FIGS. 1, 3 and 5, and when the air distribution member 6 is placed in the second position 102, as illustrated in FIGS. 2, 4 and 6. The circulation chamber 9 has a triangular profile, the line 7 of which forms the apex of the triangular profile.

A second end plate 11c of the first heat exchanger 11 is at a second, non-zero distance D2 from the second heat exchanger 12 so as to form an intake opening 10 for the flow of air 23 toward the circulation chamber 9 and then towards the second heat exchanger 12. The second distance D2 is measured between the second end plate 11c of the first heat exchanger 11 and the second heat exchanger 12 in a direction orthogonal to the second plane of overall extension P2 of the second heat exchanger 12. The intake opening 10 for the flow of air 23 forms a single air inlet opening toward the circulation chamber 9.

It will also be noted that the air distribution member 6 extends from the intake opening 10 to the air inlet 3, in order to optimize circulation of the flow of air 23 toward the circulation channel 8 and the circulation chamber 9 when the air distribution member 6 is in the first position 101, or else solely toward the circulation chamber 9 when the air distribution member 6 is in the second position 102.

The housing 2 comprises a first wall 25 arranged as a guide ramp for the flow of air 23 that is vertically above the first heat exchanger 11 and that extends between the air inlet 3 and the first end plate 12b of the second heat exchanger 12. The housing 2 comprises a second wall 26 which extends between the air inlet 3 and the second end plate 12c of the second heat exchanger 12.

In FIGS. 1 to 4, the air distribution member 6 comprises a single flap 60 which is rotatable about an axis of rotation A1 belonging to the flap 60. In other words, the flap 60 has the axis of rotation A1 about which the flap 60 rotates. To enable the rotation of the flap 60 on itself, the heat exchange module 1 comprises an operating member 30 for the flap 60 which is able to actuate the flap 60 via an axis of operation A2 of the flap 60, in the first position 101 or in the second position 102.

The flap 60 extends between a first longitudinal end 601 and a second longitudinal end 602 of the flap 60, which ends define a plane of overall elongation P5 of the flap 60, the first longitudinal end 601 and the second longitudinal end 602 of the flap 60 being comprised in succession inside the plane of overall elongation P5 of the flap 60.

In FIGS. 1 and 2, the first longitudinal end 601 of the flap 60 is provided with the axis of rotation A1, whereas the second longitudinal end 602 of the flap 60 is provided with the axis of operation A2. The first longitudinal end 601 is contiguous with the first heat exchanger 11 in the first position 101 and the second position 102 of the flap 60.

The first longitudinal end 601 of the flap 60 has a tapered profile and the second longitudinal end 602 of the flap 60 has a curved profile, the profiles being considered in a section plane P6 which is orthogonal to the axis of rotation A1 and the axis of operation A2.

The housing 2 comprises an oblong aperture 31 forming a passage for the operating member 30 of the flap 60. The oblong aperture 31 is formed in a sidewall of the housing 2 which adjoins the first wall 25.

In FIGS. 3 and 4, the second longitudinal end 602 of the flap 60 is provided with the axis of rotation A1 and the axis of operation A2. The first longitudinal end 601 is contiguous with the first heat exchanger 11 in the first position 101 of the flap 60, illustrated in FIG. 3.

The first longitudinal end 601 of the flap 60 has a curved profile and the second longitudinal end 602 of the flap 60 has a tapered profile, the profiles being considered in the section plane P6 which is orthogonal to the axis of rotation A1 and the axis of operation A2.

In FIGS. 5 and 6, the air distribution member 6 comprises two flaps 61, 62, namely a first flap 61 and a second flap 62, which are each rotatable about an axis of rotation A1 belonging to the flap 61, 62. In other words, each flap 61, 62 has a specific axis of rotation A1 about which the flap 61, 62 rotates. To enable the rotation of the flap 61, 62 on itself, each flap 61, 62 is provided with an operating member 30 specific to the flap 61, 62 which is able to actuate the flap 61, 62 via an axis of operation A2 of the flap 61, 62. According to the variant illustrated in FIGS. 5 and 6, the axis of rotation A1 and the axis of operation A2 of each flap 61, 62 are separate from one another.

The first flap 61 has a first-flap first longitudinal end 611, which is contiguous with the first heat exchanger 11, and a first-flap second longitudinal end 612, which is contiguous with a second-flap first longitudinal end 621 which the second flap 62 comprises at least in the first position 101 of the flaps 61, 62. The second flap 62 comprises a second-flap second longitudinal end 622, which is contiguous with the air inlet 3.

The first longitudinal end 611, 621 of each flap 61, 62 is provided with the axis of rotation A1 of the flap 61, 62, whereas the second longitudinal end 612, 622 of each flap 61, 62 is provided with the axis of operation A2 of the flap 61, 62. The operating member 30 of each flap 61, 62 which is able to circulate inside a respective oblong aperture 31 of each operating member 30.

In FIG. 5, which shows the flaps 61, 62 in the first position 101, in which they prevent the flow of air 23 from passing through the first heat exchanger 11 while still allowing the flow of air 23 to pass through the second heat exchanger 12, the second longitudinal end 612 of the first flap adjoins the first end 621 of the second flap 621.

In FIG. 6, which shows the flaps 61, 62 in the second position 102, in which they allow the flow of air 23 to pass through the first heat exchanger 11 and the second heat exchanger 12, an air passage 27 is formed between the second longitudinal end 612 of the first flap and the first end 621 of the second flap in order to enable the flow of air 23 to circulate inside the circulation channel 8. The air passage 27 is formed on the basis of an operation of the flaps 61, 62 actuated by the operating member 30.

Figure 7:
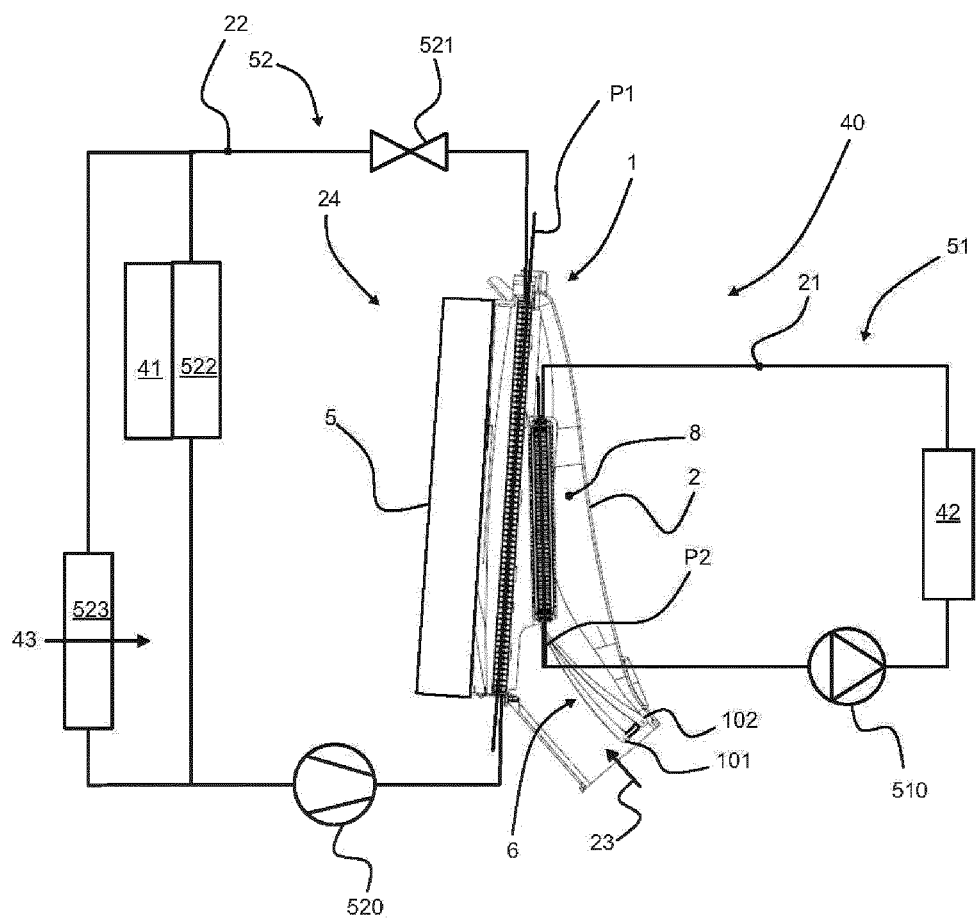
FIG. 7 shows a heat treatment installation which is able to modify a temperature of a motor vehicle interior and/or of an electrical energy storage device of the motor vehicle and/or means for controlling an electric motor propelling the motor vehicle, the installation comprising a heat exchange system shown in the preceding figures.

In FIG. 7, the heat exchange system 24 just described can be applied particularly and advantageously in a heat treatment installation 40 which is able to modify a temperature of a motor vehicle interior and/or an electrical energy storage device 41 of the motor vehicle and/or control means 42 for controlling an electric motor propelling the motor vehicle. To that end, the first heat exchanger 11 constitutes a cooling circuit 51 of the control means 42 for controlling the electric motor, and the second heat exchanger 12 constitutes a refrigerant fluid circuit 52 configured to modify the temperature of the electrical energy storage device 41 and/or blown air 43 intended to be admitted into the motor vehicle interior.

The cooling circuit 51 comprises, besides the first heat exchanger 11, at least one pump 510 for circulating the first fluid 21, for example constituted by glycol water or similar, between the first heat exchanger 11 and the control means 42 for controlling the electric motor.

The refrigerant fluid circuit 52 comprises at least one compressor 520 for compressing the second fluid 22, for example formed by a refrigerant fluid, carbon dioxide or similar, the second heat exchanger 12 for discharging heat energy to the flow of air 23, an expansion member 521 inside which the second fluid 22 undergoes expansion, a first heat exchanger 522 which is arranged to cool the electrical energy storage device 41, and a second heat exchanger 523 which is arranged to cool the blown air 43.

Such a heat treatment installation 40 is more particularly dedicated to a motor vehicle provided with at least one electric motor forming a propulsion means of the motor vehicle, this electric motor being supplied with electrical energy via the electrical energy storage device 41. The electrical energy storage device 41 can notably be recharged in a rapid charging mode, in which the electrical energy storage device 41 heats up rapidly.

In this case, a method for implementing the heat treatment installation 40 comprises two distinct modes of implementation depending on whether the motor vehicle is in running mode or in the rapid charging mode of the electrical energy storage device 41.

In the running mode of the motor vehicle, the air distribution member 6 is placed in a first position 101 to enable the flow of air 23 entering the housing 2 via an air inlet 3 to pass through the first heat exchanger 11, configured as a radiator, to cool the control means 42 and to pass through the second heat exchanger 12, configured as a condenser, to cool the second fluid 22 circulating inside the refrigerant fluid circuit 52.

In the rapid charging mode of the electrical storage device 41, the air distribution member 6 is placed in a second position 102 to prevent circulation of the flow of air 23 through the first heat exchanger 11 and to prioritize circulation of the flow of air 23 through the second heat exchanger 12, configured as a condenser, to cool the second fluid 22 circulating inside the refrigerant fluid circuit 52 and cool the electrical energy storage device 41 and/or the blown air 43 intended to be admitted into the motor vehicle interior.

The invention claimed is:

1. A heat exchange module comprising:
   at least two heat exchangers, namely a first heat exchanger, wherein the first heat exchanger is configured to enable heat exchange between a first fluid and a flow of air and extend inside a first plane of overall extension, and a second heat exchanger, wherein the second heat exchanger is configured to enable heat exchange between a second fluid and the flow of air and extend inside a second plane of overall extension;
   wherein the first plane of overall extension is separate from the second plane of overall extension;
   at least one housing delimiting, with the first heat exchanger, a circulation channel for the flow of air; and
   at least one air distribution member, positioned upstream of both the first heat exchanger and the second heat exchanger, which is movable between a first position, in which the air distribution member allows the flow of air to pass through the first heat exchanger and then the second heat exchanger, and a second position, in which the air distribution member prevents the flow of air from passing through the first heat exchanger while still allowing the flow of air to pass only through the second heat exchanger.

2. The heat exchange module as claimed in claim 1, wherein the air distribution member comprises at least one flap which can rotate about an axis of rotation belonging to the flap, the heat exchange module comprising an actuator which is intended for operating the flap and is configured to actuate the flap via an axis of operation of the flap, the flap extending between a first longitudinal end and a second longitudinal end of the flap, which ends are comprised inside a plane of overall elongation of the flap, the axis of rotation and/or the axis of operation being able to be inscribed in the plane of overall elongation of the flap.

3. The heat exchange module as claimed in claim 2, wherein the axis of rotation and the axis of operation are separate from one another.

4. The heat exchange module as claimed in claim 2, wherein the axis of rotation and the axis of operation coincide.

5. The heat exchange module as claimed in claim 1, wherein the first plane of overall extension of the first heat exchanger and the second plane of overall extension of the second heat exchanger are concurrent and between them form a first angle ($\alpha$) of less than 45°.

6. The heat exchange module as claimed in claim 1, wherein the first heat exchanger and the second heat exchanger each comprise:
   a heat exchange core interposed between a first end plate and a second end plate, and
   a dimension of the first heat exchanger measured between the first end plate and the second end plate of the first heat exchanger being smaller than a dimension measured of the first end plate and the second end plate of the second heat exchanger.

7. The heat exchange module as claimed in claim 6, wherein a first end plate of the first heat exchanger is vertically above a line of the second heat exchanger, the line extending at a first distance corresponding to one third, to within +/−10%, of a total transverse dimension of the second heat exchanger.

* * * * *